Aug. 5, 1969

E. K. HOYNE 3,460,157

CORPUSCULAR BEAM RECORDER

Filed Nov. 3, 1967

INVENTOR.
EARL K. HOYNE
BY
Carpenter Kinney & Coulter
ATTORNEYS

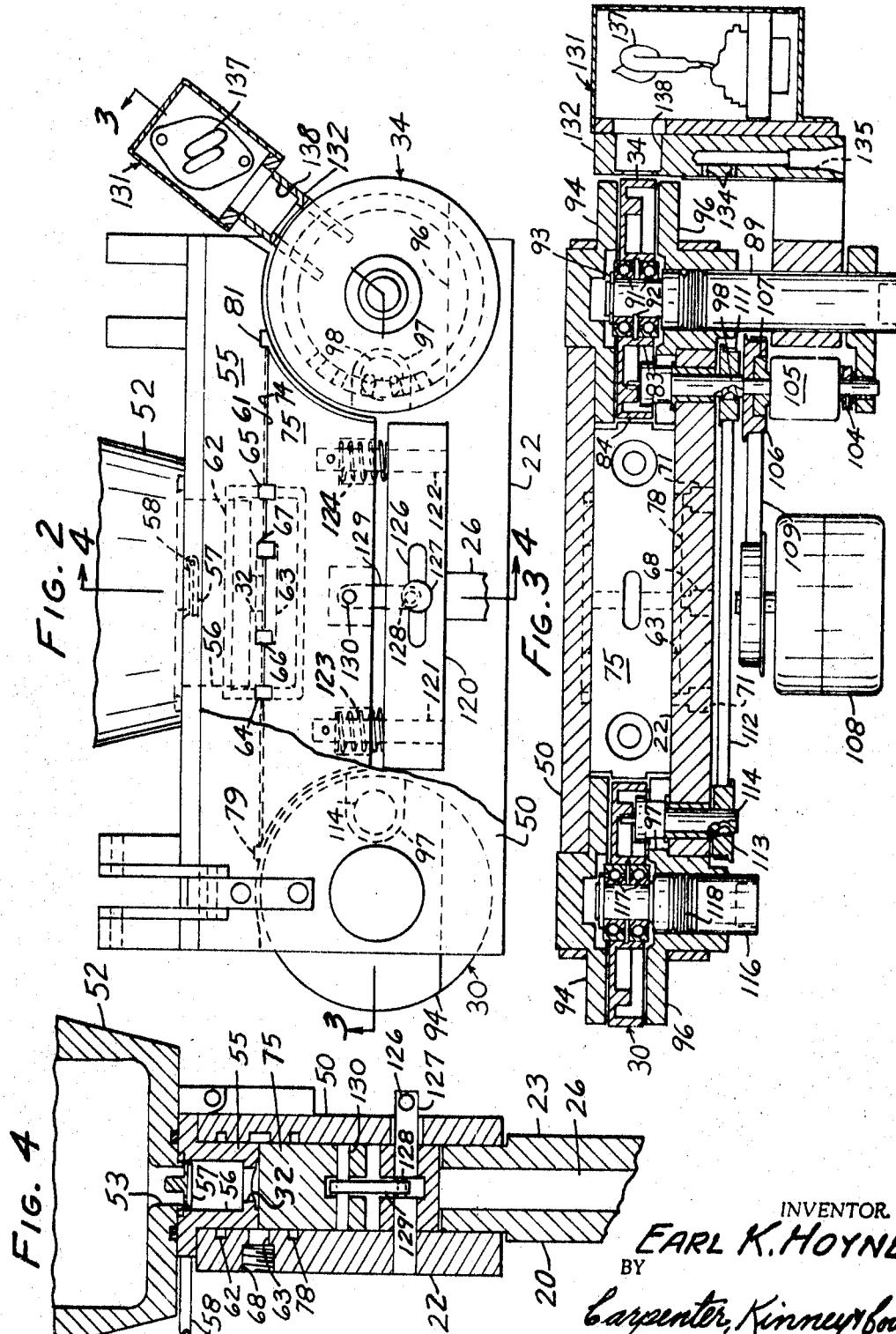

Aug. 5, 1969

E. K. HOYNE 3,460,157

CORPUSCULAR BEAM RECORDER

Filed Nov. 3, 1967

INVENTOR.
EARL K. HOYNE
BY
Carpenter Kinney & Coulter
ATTORNEYS though in Fridley, Minn., assignor to Minnesota
United States Patent Office
3,460,157
Patented Aug. 5, 1969

3,460,157
CORPUSCULAR BEAM RECORDER
Earl K. Hoyne, Fridley, Minn., assignor to Minnesota
Mining and Manufacturing Company, St. Paul, Minn.,
a corporation of Delaware
Filed Nov. 3, 1967, Ser. No. 684,096
Int. Cl. G01d 9/42
U.S. Cl. 346—110          10 Claims

ABSTRACT OF THE DISCLOSURE

A web transport for a corpuscular beam recorder having a linear constrictive web path formed in opposed polished, aluminum oxide coated faces of aluminum members. The gas seal along said path being formed by two roughing slots on each side of an at least partially evacuated beam aperture and symmetrically disposed relative to the aperture. The spacing of the slots between the aperture and the first slot, between the slots, and between the second slot and the end of the path being in a proportion of $1 : \leqq 1 : > 3$ respectively. The web is advanced through the path by incrementally and simultaneously driven capstans, one at each end of the path.

---

This invention relates to a web transport for moving a web from an area at atmospheric pressure into and through an area of low pressure, wherein one surface of the web may be directly bombarded by a corpuscular beam.

In one aspect this invention is particularly related to electron beam recorders wherein a beam in a low pressure atmosphere is directed onto a medium to impart graphic information thereto and is particularly adapted for high-speed recording of successive images on 16 mm. film.

In equipment of this class several problems have been encountered. These problems are scratching and marring of the film, excessive air leak, excessive pump size, and "sticking" of the film in the equipment due to electrostatic effects. The latter problem is quite significant in that it enhances the chances of film scratching and marring and requires greater forces to move the film.

In prior attempts to overcome these problems in systems utilizing a constricted fixed dimension pumped slit as opposed to other tried systems such as pressure rollers, friction seals, liquid gates, endless belts, and combinations of these, people have tried lubricated films, plates or shoes of brass, polished stainless steel, chromium-plated aluminum, film transports where the film becomes one wall of the slot, grounding plates, and pumps rated up to 20 c.f.m.

Applicant has overcome these perpetual problems by utilizing a linear film path into and out of an area of subatmospheric or high negative pressure wherein the film moves along a path formed by aluminum oxide coated faces of a pair of contiguous aluminum members. The film path is defined by a constricted slit formed by the members and opening into areas at atmospheric pressure. The coated faces on the aluminum members affords a low friction smooth polished hard film support which will not scratch or marr the film, an insulating coat to reduce "sticking" due to electrostatic charges, and a low friction surface to lessen the force necessary to transport the film through the slit.

The vacuum seal for the beam-generating chamber is produced by a pair of roughing slots on each side of a beam aperture and spaced within the slit and relative to the aperture to minimize the length of the slit, minimize the size of the pumps, and maximize their efficiency.

In the present invention film movement for rapid and precise positioning of successive frame sections or areas at the beam aperture is afforded by two simultaneously driven capstans, positioned one at each end of the linear slit. The incremental movement of these capstans is accomplished by a modified internal Geneva-type drive which utilizes two pins, instead of the conventional one pin, and a one-half revolution drive clutch to advance and brake the capstans.

The above and additional novel features and advantages of the present invention will become more apparent after a perusal of the following detailed description which refers to the accompanying drawing wherein:

FIGURE 2 is a fragmentary elevational view, partly in section, with some parts removed, of the web transport and seal assembly;

FIGURE 3 is a sectional view taken along line 3—3 of FIGURE 2;

FIGURE 4 is a vertical sectional view taken along line 4—4 of FIGURE 2;

Figure 1:
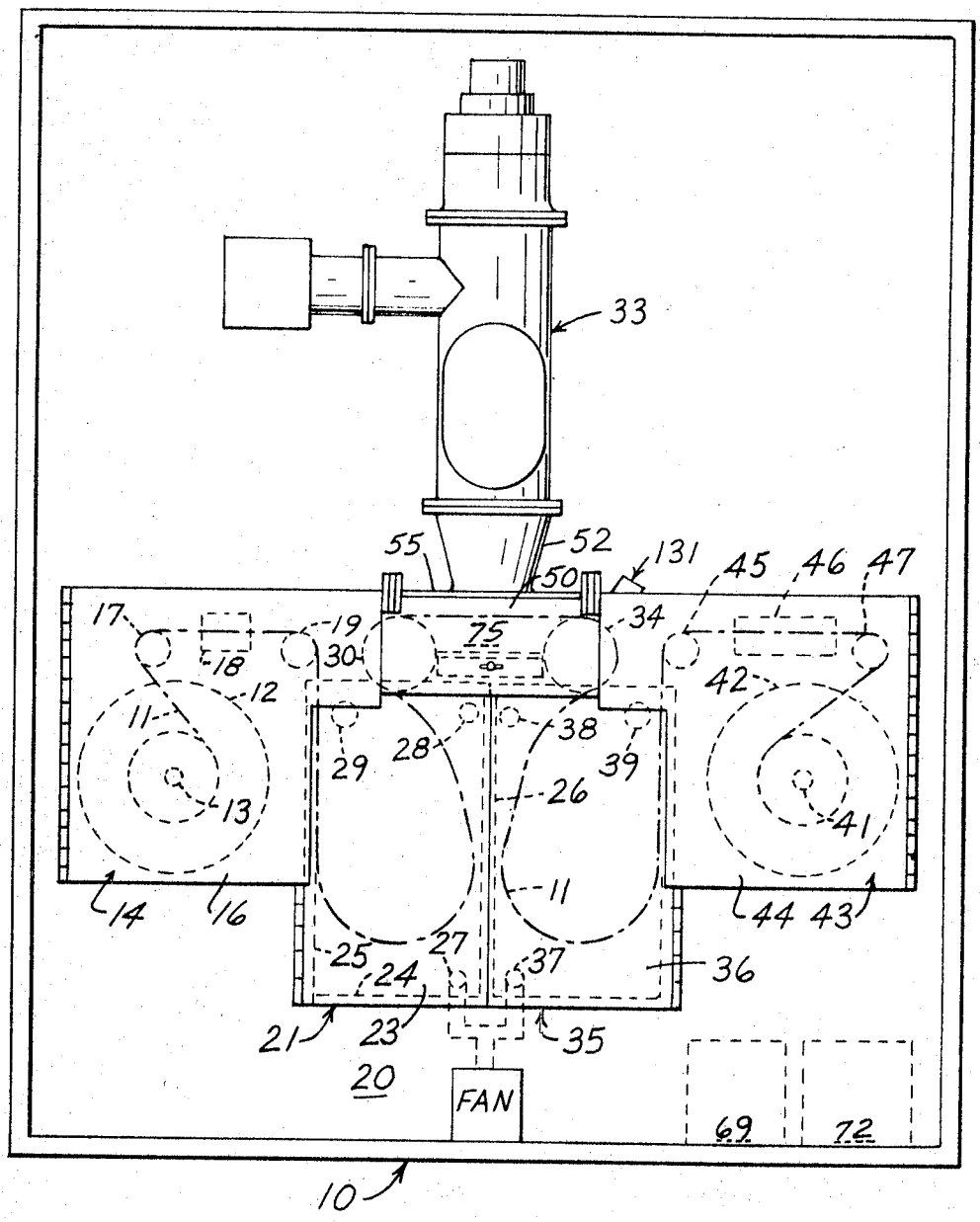
FIGURE 1 is a generally schematic elevational view of an apparatus constructed in accordance with the present invention.
Figure 5:
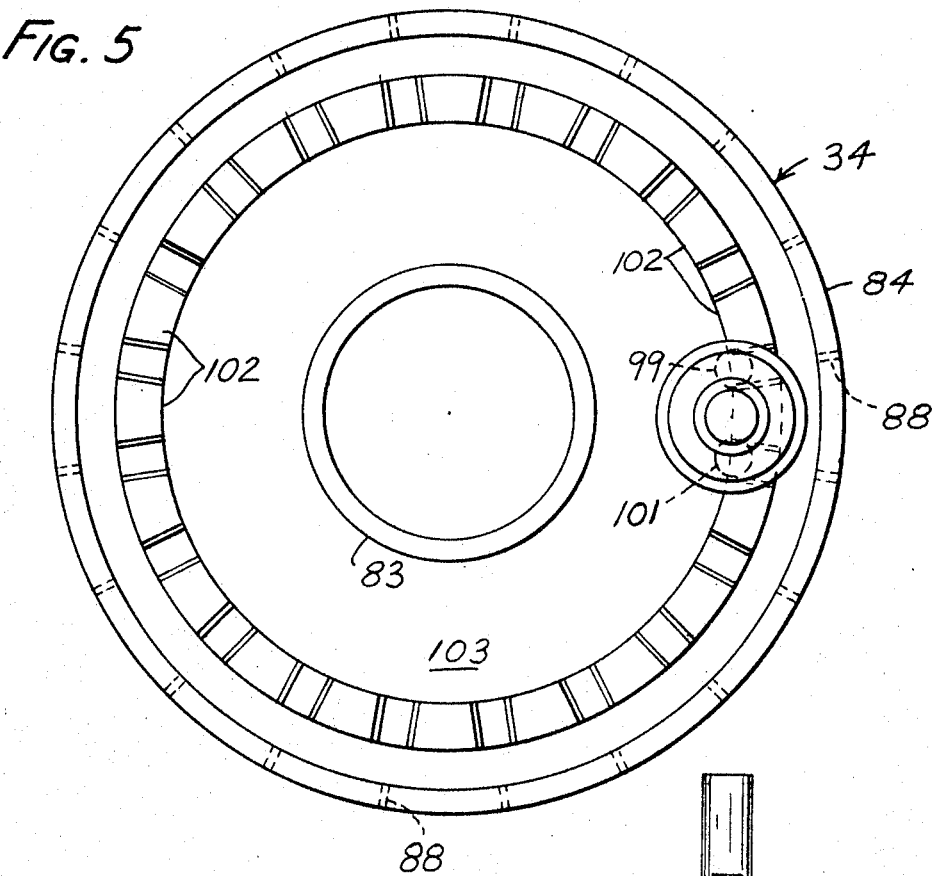
FIGURE 5 is a detail view of a capstan.

A preferred web or medium for corpuscular beam recording comprises a beam-sensitive emulsion on a polyester backing such as "Mylar," and preferably heat developable. In the illustrated recorder 10 the web or film 11 will be stored on a reel 12 mounted on a driven spindle 13 in a light-tight chamber 14 as illustrated on the left side of the recorder 10 in FIGURE 1. The chamber 14 has a hinged front door 16 affording access to the spindle 13. From the reel 12 the film 11 is passed over an idler 17, through a film cleaner 18 to another idler 19 at the entrance to a vacuum loop chamber 21.

Loop chamber 21 is formed between a back plate 20, a front hinged cover 23, a bottom plate 24, and spaced felt or flock-lined edge walls 25 and 26. Wall 26 is also a common wall between loop chamber 21 and a second loop chamber 35. The vacuum in the loop chamber is provided by a source of subatmospheric pressure (a fan or blower to provide a suction of about 4 inches of water) which communicates therewith through ports 27 and 28. A conventional sensing device is mounted in a port 29 to control the drive on spindle 13 to supply film in the loop chamber 21.

From the loop chamber 21 the film passes over a driven capstan 30, into a slit leading past a recording aperture 32 at the end of an evacuatable chamber 33, housing beam-generating and focusing means. The beam-generating means and optical elements are disclosed in a copending application of Robert S. Berglund for Lens for Electron Beam Recorder, Ser. No. 680,437, filed Nov. 3, 1967 and assigned to the assignee of this application. From the slit the film passes over another driven capstan 34 and into the second vacuum loop chamber 35. Loop chamber 35 is essentially a mirror image of the chamber 21 with the common wall 26. It has a hinged cover 36, evacuation ports 37 and 38, and a sensing device 39 to control the drive for a drive capstan 47. A driven spindle 41 is adapted to support and drive a take-up reel 42 to wind film advanced by capstan 47. The spindle 41 is located in a light-tight chamber 43 having a hinged door 44 affording access thereto. Between the loop chamber 35 and reel 42 the film travels over an idler roll 45, through a diffused hot air film processor 46, and over the driven capstan 47.

The doors 16 and 44 and the covers 23 and 36 close together to a convenient close fitting relationship. The covers 23 and 36 close over the loop chambers and are then held closed by a plate 50 which substantially covers the film transport and which has routed passageways communicating with roughing slots which hold it tight. The plate 50 is hinged at its upper edge as best shown in FIGURES 2 and 4. Doors 16 and 44 close over the covers completing a light-tight cover over the transport.

The film transport, including the capstans 30 and 34, loop chamber, the vacuum sealing components etc., is disposed at the lower end of the chamber 33, which end has a generally circular lower pot-like end member 52, as illustrated in FIGURES 1 and 4, formed with a central circular opening 53. The terminal end of the chamber is mounted centrally above a first elongate gas-impervious block-like member 55 which is generally T-shaped in cross-section. The upper central portion of member 55 has a recess 56 over which the pot 52 is sealed. A flap valve 57, of generally circular form, is disposed within recess 56 and is pivoted about the axis of a pin 58 from an open position to a position closing opening 53. The member 55 is also formed with the beam aperture 32 which is rectangular and directly beneath and aligned with opening 53 and which, when valve 57 is open, affords direct communication between the evacuatable chamber 33 and the lower face 61 of said member 55.

The member 55 is mounted on a back plate 22 to which the back plate 20 is bolted. As indicated, by the dotted lines in FIGURE 2 and as shown in FIGURE 4, the back plate 22 is formed with passageways 62 and 63 in its front face which connect two outer roughing slots 64 and 65 and two inner roughing slots 66 and 67, respectively. The slots 64–67 extend transversely across the lower face 61 of the member 55.

As shown in FIGURES 2 and 4, the inwardly disposed slots 66 and 67 and the passageway 63 in the face of the plate 22, communicate with a bore 68 in the plate 22, to which is connected the inlet of a vacuum pump 69, which serves to evacuate air from said passageway and slot. The passageway 62 is similarly connected through a pair of bores 71 in the plate 20 (located in aligned relation to roughing slots 64 and 65) to a separate vacuum pump 72.

A web or film path is formed between the face 61 of member 55 and the upper face 74 of a second block-like member 75 by channel means. In the illustrated embodiment the path is formed by a longitudinally extending channel 76 formed in the face 61. As best shown in FIGURE 4 the channel 76 is generally rectangular with slightly arcuate central configuration, giving the channel a central vertical dimension greater than the dimension along its edges to avoid contact with the emulsion surface. The channel 76 is centrally disposed relative to the lower face 61 and communicates with the roughing slots 64–67 and crosses the beam aperture 60 formed in the member 55.

The second block-like member 75 is disposed beneath the member 55 and the upper planar face 74 thereof fits contiguously against the face 61 and closes channel 76 to define a constricted film path or slit. The face 74 of the second member 75 is also formed with transversely extending slots identical to and aligned with the slots 64, 65, 66, and 67 in the member 55 and communicate therewith to form roughing slots on each side of the film path. Separate numerals for these slots have not been used herein to avoid confusion. A further passageway 78 disposed in the plate 22 connects the outermost slots in the member 75, and a side of the second member forms one wall for this passageway 78 and for part of the passageway 63. The plate 50 has routed slots defining passageways identical to the passageways 61, 63, and 78 in the plate 22. These passageways in the plate 22 and in plate 50 restrict leakage between the plates and members 55 and 75 and thereby permits gasketless sealing for the plates and members. Adjacent each end of the member 55 and at the ends of member 75 the slit terminates. In these areas the member 55 is formed with additional transverse grooves 79 and 81 to balance the forces on the film as it moves from the capstan 30 into the slit and out of the slit onto the capstan 34.

Figure 6:
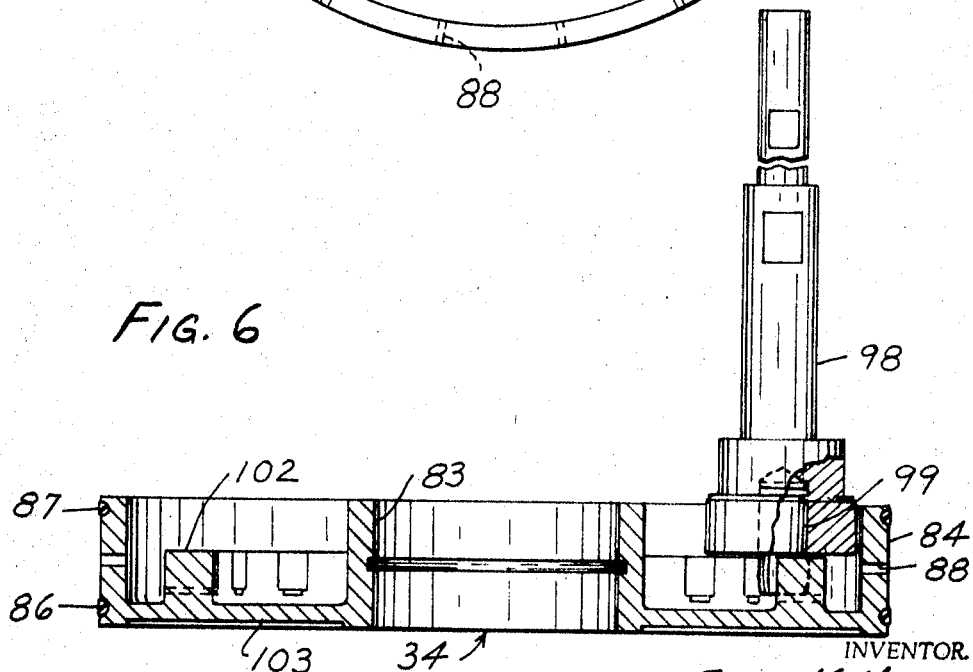
FIGURE 6 is a sectional view of the capstan of FIGURE 5 and a drive therefor.

Referring now to FIGURES 2, 3, 5, and 6 the capstans 30 and 34 comprise generally hollow circular drums having a hub portion 83 and an outer peripheral cylindrical surface 84 joined by an end plate 103. The outer cylindrical surface of capstan 34 (FIGURE 6) has two axially spaced O-rings 86 and 87 received in grooves formed about the peripheral surface. The O-rings 86 and 87 are ground to provide a flat film-supporting surface about the periphery of the capstan in axially spaced relation. The outer peripheral surface 84 is also formed with tiny openings 88 which communicate with the inner cavity of the capstan through which vacuum pressure may pass to hold the film 11 against the rings 86 and 87. The capstan 30 does not have the O-rings as it is not the primary drive wheel, but has the openings 88. The hubs 83 of the capstans 30 and 34 are formed with enlarged central bores which receive a support shaft. In the case of capstan 34, a support shaft 89 has a reduced end portion upon which is mounted a set of bearings 91 retained by an internal snap ring 92 and an outer snap ring 93. Each of the capstans 30 and 34 is centered by fine adjustment between two cheek plates 94 and 96. The plates 94 are mounted on the hinged door 50 covering the transport and the inner plates 96 are supported on the back plate 22. The cheek plates 96 have crescent-shaped slots 97 formed therein through which is received the drive shafts. The capstan 34 is driven by a shaft 98 carrying a pair of pins 99 and 101 projecting outwardly from one end of the shaft in radially spaced relation from the center of the shaft and disposed along a diametrical line. These pins 99 and 101 drive the capstan 34 by engagement with circumferentially disposed and axially extending teeth 102 projecting axially from the end plate 103 of the capstan at approximately the radius of gyration. The pins 99 and 101 are freely mounted in the end of the shaft 98 and are retained by a snap spring 104 which engages their inner ends as best shown in FIGURE 6. These pins 99 and 101 are spaced to engage opposite sides of an individual tooth 102 when the shaft 98 is in a rest position as illustrated. Rotation of the shaft 98 through 180° or one-half a revolution causes the capstan to advance or rotate through an arc corresponding to the included angle between successive teeth. This is afforded by one pin moving in an arc against one edge of a tooth to accelerate the wheel as the other pin is withdrawn from between two teeth and advanced to the slot between consecutive teeth. The driving pin then decelerates the wheel and the other pin locks the wheel when advanced between the teeth again to place the drive in the rest position. This affords a rapid incremental advance and braking for the capstans. The shaft 98 is driven through one-half a revolution by a suitable commercially available solenoid-unlatching or triggering spring clutch 105 positioned on the shaft 98. Rotative force is supplied to the spring clutch 105 from a pulley 106 mounted on a freely rotatable driving disk 107 for the driving element of the spring clutch 105. The driven collar 104 of the spring clutch is secured to the shaft 98 as by a set screw. The pulley 106 is suitably driven from a constant speed electric motor 108 and belt 109. When the solenoid releases the clutch spring the shaft 98 is rotated until the spring is arrested again by a pawl. Mounted on the shaft 98 and fixed for rotation therewith is a further pulley 111 around which a timing belt 112 is positioned to drive simultaneously therewith a pulley 113 fixed to a shaft 114 which drives the capstan 30. The shaft 114 has a two-pin drive corresponding to the drive above-described for capstan 34. The capstan 30 is mounted on a shaft 116 supported from an inner cheek plate 96 by means of bearings 117 and centered between the cheek plate 96 and a cheek plate 94 by fine threads 118 and a plug in the cheek plate 96.

As will be noted in FIGURES 1 and 2, the capstans 30 and 34 are disposed above the loop chambers 21 and 35 and the negative pressure in the chambers is imparted to the tiny peripheral holes 88 in the capstans since it is allowed to reach the cavity in each capstan through the crescent-shaped slots 97 in the rear cheek plates 96. The vacuum pressure in the loop chambers 21 and 35 is also imparted to the film between the capstans 30 and 34 and the ends of the member 75. This negative force is neutralized however by the slots 79 and 81 which communicate with the vacuum loop chambers around the edges of the film 11 in these areas where the film is bridging between either capstan and the member 75.

A rectangular block 120 is fixedly mounted to the back plate 22 beneath the member 75 and has vertically disposed bores 121 and 122 which slidably support pins about which helical compression springs 123 and 124 are positioned to bias the member 75 and the upper face 74 thereof into contact with the face 61 of the member 55. When it is desired to thread the film transport, a handle 126 fixed to a shaft 127 may be rotated 180°, thus causing the rotation of an eccentric or crank pin 128 on the inner end of the shaft 127, as best shown in FIGURE 4. Rotation of the eccentric pulls on a link 129 which is connected to the eccentric and to the member 75 by a pin 130, as illustrated in FIGURES 2 and 4. Rotation of the handle 126 thus pulls the member 75 away from the member 55 against the bias of springs 123 and 124 affording sufficient clearance between the members 55 and 75 for placement of the film 11 in the film path. Movement of the handle 126 back to its original aligned position with the member 120 permits the springs to bias the members into tight-fitting sealing engagement. The shaft 127 projects through an opening in plate 50.

A forms-projecting device 131 is supported on the apparatus adjacent to the capstan 34. This forms-projecting device comprises a support block 132 having a lower face 133 against which a strip of negative film may be held in aligned relationship with the capstan by a negative pressure applied through tiny openings 134 communicating with a bore 135. The image of the negative is of a form, e.g., lines, graph lines etc., and is thus closely spaced to the film 11 exiting from the slit. The negative image is registered and imparted onto the film on the capstan 34 by a triggered or flash light source 137 which affords exposure of the film 11 to the format on the negative through a light path 138. The movement of the film by the capstans through the slit is precisely controlled such that as successive frames exit the slit and move about the periphery of the capstan 34, they come into register with the negative, and the light source 137 imparts to the film an image corresponding to that of the negative.

Referring now more particularly to the member 55 and 75, it is preferred that these members be formed of aluminum (alloy type 6061), making the parts generally less expensive, with at least the opposed contacting faces 61 and 74 of the two members, which define the film path being coated with aluminum oxide as by anodizing or "hard coating." The preferred system is the hard coating, which is a process of the Aluminum Company of America, which is a controlled electro-chemical conversion of aluminum and its alloys to an aluminum oxide, which is harder and more wear resistant than ordinary anodizing. This process is not like electroplating but causes an actual chemical change in the aluminum surface itself through the oxide, and although very similar to normal anodizing, it differs in that the temperature of the solution is held below the freezing point of water, a current density about 4 times that of normal anodizing is used, and the time of processing is 5 to 15 times longer, depending upon the thickness of the coating desired. In the present embodiment the hard-coating layer preferably has a thickness of about .001 (.025 mm.). The hard coat is then polished, providing a very hard smooth nonconductive layer on the opposed faces of the members.

The slit for the film, when used with 16 mm. film (.63 inch wide and .0035 inch thick or .1 mm.), has a width dimension of between .632–.634 inch (16–16.1 mm.) and a height at the center of 0.0047 inch (.12 mm.), and at the edges of about 0.0038 to 0.0042 inch (0.1016). The length of the slit betwen the entrance and exit points, the roughing slots, and the beam aperture are determined to increase the efficiency of the system and yet maintain the desired pressure within the beam aperture. To accomplish this the lineal spacing or length of the slit (a) between the edge of the beam aperture 31 to the edge of the inner roughing slots 66 and 67, (b) between the outer edge of the inner roughing slots 66 and 67 to the inner edge of the outer roughing slots 64 and 65, and (c) between the outer edge of the outer roughing slots 64 and 65 to the respective ends of the slit should be so selected as to provide the maximum efficiency of the system with the use of the smallest pumps. It has been found that pumps having the rating of 10.2 cubic feet per minute (290 liters per minute) for pumping the roughing slots is an economical size and that respective spacings referred to above should be in a proportion of $1:\leqq 1:>3$. In the illustrated device the spacing or the lengths (a), (b), and (c) are respectively $5/16$ of an inch (7.9 mm.); $5/8$ of an inch (15.8 mm.); and 2 and $1/4$ inches (15.15 mm.). Thus a pressure of 60,000 microns of mercury can be maintained in the outer roughing slots; a pressure of 25 microns of mercury can be maintained in the inner roughing slot, and a pressure of 0.1 micron of mercury can be maintained within the beam aperture with the 10.2 cubic feet per minute pumps connected to the inner slots through the bore 68 and a similar pump connected to the outer slots through bores 71.

The member 75 is grounded, and during operation of the recorder an electrostatic charge is built up on the film. This charge is retained on the film by the insulating Mylar backing of the film and the insulating hard coat layer on the members 55 and 75. The force of this electrostatic charge holds the imaged film against the face 74 and serves advantageously to flatten the unexposed film against face 74 in the focal plane beneath aperture 32 to improve the resolution of the image. The coefficient of friction of the hard coat aluminum on members 55 and 75 is low and the film, expecially when having a Mylar backing, will move along the slit with little force even when carrying the electrostatic charge. The force to move acetate-backed films is slightly higher but the aluminum oxide surface affords an optimum film-support surface for transports where the film is moved over a stationary member.

Having described the invention with reference to the embodiment illustrated in the drawing, it is to be understood that changes may be made therein without departing from the spirit or scope of the invention.

What is claimed is:

1. In a corpuscular beam recording apparatus wherein the corpuscular beam impinges on a web of recording medium to impart information thereon, the combination of
   means defining a chamber in which a beam may be generated and focused,
   a first and second member formed of aluminum and having contiguous aluminum oxide coated faces, said first member being joined to one end of said chamber and being formed with an opening communicating directly with said chamber and its coated face to permit passage of a said beam through said opening,
   at least one of said first and second members having channel means defining a linear web path along said faces and across said opening,
   said first and second members having wall means defining two spaced transverse roughing slots along said path on each side of said opening and of said path, said slots nearest said opening being joined by passage means for evacuation by one pump and the outermost slots being joined by passage means for evacuation by another pump, and means for progressively feeding a said web along said path to afford impingement of said beam upon said web as the same moves across said opening.

2. The combination of claim 1 wherein said channel means defining said web path is a constrictive slit slightly larger than a said web, and said roughing slots are spaced symmetrically on each side of said opening, the lineal distance (a) between said opening and the first slot, the lineal distance (b) between the slots, and the lineal distance (c) between the second slot and the end of the path being such that (b) is at least equal to (a) and (c) is at least 3 times (a).

3. The combination of claim 1 wherein said means for progressively feeding a said web comprises a driven roller positioned at each end of said path.

4. The combination of claim 3 wherein said driven rollers are driven incrementally and simultaneously to advance successive areas of a said web into register with said opening to permit the beam to scan said areas while stationary.

5. The combination of claim 2 wherein said constrictive slit defining the web path has a greater dimension in the longitudinal center of the slit than at its edges to avoid contact with one face of a said web.

6. In a device for treating a web by impinging a corpuscular beam directly onto the web, the combination of
means defining an evacuatable chamber in which a beam may be generated,
a first member disposed at one end of said chamber, said first member having a generally flat elongated face and an opening communicating directly with said chamber and the central portion of said face,
a second member having a generally flat elongated face positioned contiguously to said face of said first member,
at least one of said first and second members being channeled longitudinally across said face to define a constrictive enclosed web path which crosses said central opening,
at least one of said first and second members having means defining two evacuable roughing slots along said path on each side of said central opening and symmetrically disposed relative to said opening, the ratio of the lineal spacing between the opening and the inner slots, the spacing between the inner and outer slots, and the spacing between the outer slots and the respective ends of the path being $1:\leqq1:>3$; and
pump means separately connected to said inner slots and said outer slots.

7. The combination of claim 6 wherein a web drive capstan is disposed at each end of said web path for transporting a said web along said path.

8. A recording apparatus for imparting graphic information onto a corpuscular beam sensitive 16 mm. film by impinging said film with a corpuscular beam, comprising
means defining an evacuatable chamber in which a corpuscular beam may be generated,
a first aluminum member disposed at one end of said chamber, said first member having a generally flat elongated aluminum oxide covered face and an opening communicating directly with said chamber and the central portion of said face through which a said beam may pass to expose a said film,
a second almuinum member having a generally flat elongated aluminum oxide covered face positioned contiguously to said face of said first member,
at least one of said first and second members being channeled longitudinally across said face to define an an enclosed film path having dimensions slightly larger than a said film which path crosses said central opening,
at least one of said first and second members having means defining two evacuatable roughing slots along said path on each side of central opening, the ratio of the lineal spacing between the opening and the inner slots, the spacing between the inner and outer slots, and the spacing between the outer slots and the respective ends of the path being $1:\leqq1:>3$;
pump means separately connected to said inner slots and said outer slots for progressively reducing the pressure in said film path from each end toward said opening to a very low absolute pressure of less than 1 micron of mercury,
a film drive capstan positioned adjacent each end of said first and second members and aligned with said film path, and
means defining a subatmospheric loop chamber adjacent each capstan to supply film to one capstan and to receive the exposed film moving off said other capstan.

9. A recording apparatus according to claim 8 wherein said apparatus further comprises
a film cleaner positioned in advance of said film supply loop chamber,
a film processor disposed near said other loop chamber, and
drive means for drawing a said exposed film from said other loop chamber and through said processor.

10. In a recorder for imparting information by means of a corpuscular beam operating in a chamber at an atmosphere of low absolute pressure not exceeding 1 micron of mercury impinging directly onto a beam sensitive media, a transport for said media and seal for said chamber comprising:
a pair of members having faces in contiguous mating engagement, said faces of said members having a hard smooth low friction insulative coating thereon,
at least one of said members having an opening therein communicating directly with said chamber and said faces and having channel means formed in the face thereof defining an open constrictive linear media path having an inlet end and outlet end which crosses said opening, and having wall means defining roughing slots along said path on each side of said opening to progressively reduce the pressure within said channel means and provide balanced pressures on each side of a media within said channel means,
pumping meads connected to said roughing slots,
said media being responsive to the contact with a said beam to collect electrostatic charges,
means grounding the other of said members,
whereby said electrostatic charge and said insulative coating produces a force urging said media into contact with said other of said members to flatten the media in said path opposite said opening, and
means for progressively advancing a said media along said path.

References Cited

UNITED STATES PATENTS

| 1,736,456 | 11/1929 | Matthias | 346—110 |
| 2,597,950 | 5/1952 | Robertson | 74—436 |
| 3,037,202 | 5/1962 | McNaney | 346—110 X |
| 3,204,843 | 9/1965 | Pendleton | 226—95 |

RICHARD B. WILKINSON, Primary Examiner

JOSEPH W. HARTARY, Assistant Examiner

U.S. Cl. X.R.

74—415; 226—152; 340—173; 346—74

UNITED STATES PATENT OFFICE
CERTIFICATE OF CORRECTION

Patent No. 3,460,157      Dated August 5, 1969

Inventor(s) Earl K. Hoyne

It is certified that error appears in the above-identified patent and that said Letters Patent are hereby corrected as shown below:

In the Specification:

Column 6, line 4, after "0.1016" insert -- mm. --.

Column 6, line 25, "15.15 mm." should be -- 57.15 mm. --.

In the Claims:

Column 7, line 42, "evacuable" should read -- evacuatable

Column 7, line 71, delete "an".

Column 8, line 5, after "opening" insert -- and symmetrically disposed relative to said opening --.

Column 8, line 49, "meads" should be -- means --.

SIGNED AND
SEALED
SEP 22 1970

(SEAL)
Attest:

Edward M. Fletcher, Jr.
Attesting Officer

WILLIAM E. SCHUYLER, JR
Commissioner of Patents